Figure 1:
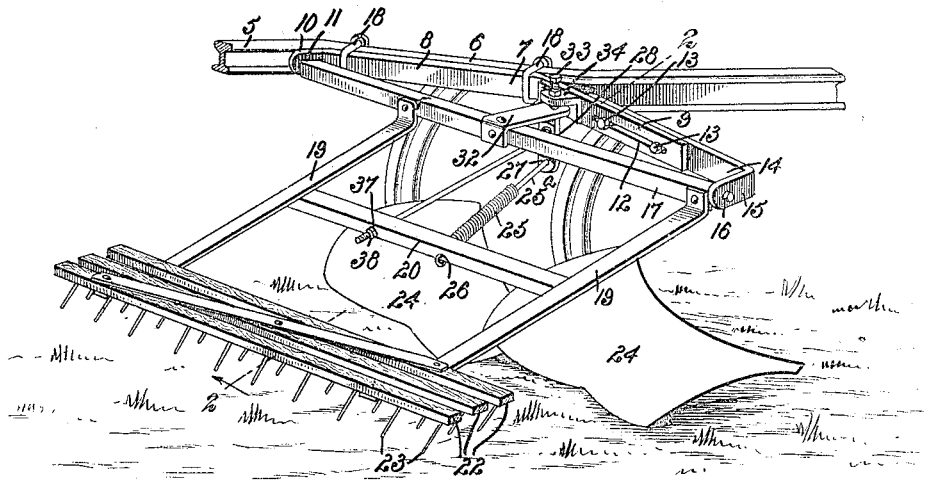

J. SWAINSON.
HARROW ATTACHMENT FOR GANG PLOWS.
APPLICATION FILED JUNE 21, 1916.

1,213,553.

Patented Jan. 23, 1917.

WITNESSES

INVENTOR
John Swainson
BY
ATTORNEYS

UNITED STATES PATENT OFFICE.

JOHN SWAINSON, OF ANGUSVILLE, MANITOBA, CANADA.

HARROW ATTACHMENT FOR GANG-PLOWS.

1,213,553. Specification of Letters Patent. Patented Jan. 23, 1917.

Application filed June 21, 1916. Serial No. 104,966.

*To all whom it may concern:*

Be it known that I, JOHN SWAINSON, a subject of the King of Great Britain, and a resident of Angusville, Manitoba, Canada, have invented a new and Improved Harrow Attachment for Gang-Plows, of which the following is a full, clear, and exact description.

My invention has for its object to provide a harrow attachment which may be conveniently attached to gang plows of various makes, and be adjusted so that the harrow will follow in line behind the plowshare.
Another object of the invention is to provide a harrow light in construction, and to obtain the desired pressure at the harrow teeth by means of a spring, there being means to limit the downward movement of the toothed portion of the harrow relatively to the plowshare, so that the said toothed portion of the harrow may be raised with the plowshare.

Additional objects of the invention will appear in the following specification, in which the preferred form of the invention is disclosed.

In the drawing similar reference characters denote similar parts in all the views, in which—

Figure 2:
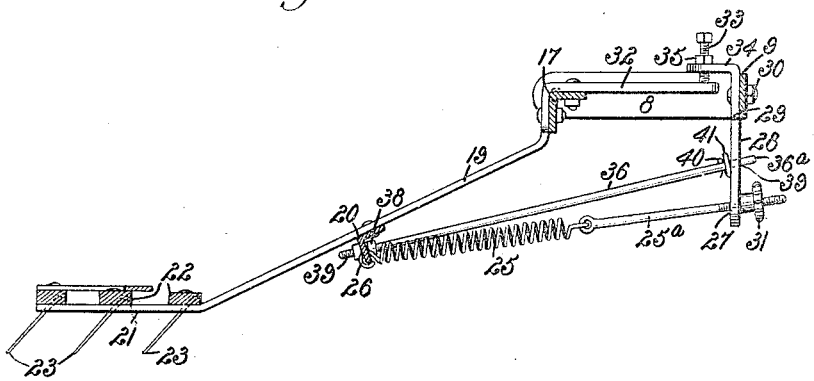

Figure 1 is a perspective view showing a fragment of a gang plow frame to which my harrow attachment is secured; and Fig. 2 is a sectional view on the line 2—2 of Fig. 1.

By referring to the drawings, it will be seen that a gang plow frame 5 has an obliquely disposed portion 6 to which the frame 7 of my harrow attachment is secured. This frame 7 has arms 8 and 9 which are disposed at an angle to each other, the arm 8 having a rearwardly extending end 10 provided with a bearing 11. The other arm 9 of the frame 7 has a slot 12 in which are disposed bolts 13 on an extension 14 of the arm 9, it being possible to move this extension relatively to the arm 9 to the desired position, when the bolts 13 may be turned home, thereby securing the extension 14 relatively to the arm. The extension 14 has a rearwardly extending end 15 with a bearing 16. In these bearings 11 and 16 are journaled the ends of a beam 17. The arm 8 of the frame 7 is secured to the portion 6 of the frame 5 of the gang plows, by means of clamps 18, it being possible to dispose the horizontal beam 17 transversely of the gang plows, as may be desired, by the adjustment of the extension 14 relatively to the arm 9, it being understood that the ends of the horizontal beam 17 are sufficiently long to engage the bearings 11 and 16 after this adjustment has been completed. If found necessary, washers may be disposed at the ends of the horizontal beam 17 to prevent lateral play of the horizontal beam 17 relatively to the frame 7.

Riveted to the horizontal beam 17 there are rearwardly extending arms 19, these arms 19 being connected by a brace 20. To the rear ends 21 of the arms 19 are bolted transversely disposed wooden strips 22, harrow teeth 23 extending through the wooden strips 22, as best illustrated in Fig. 2 of the drawings. I prefer to provide the rearward end 21 of an arm 19 at the rear of each plowshare 24, so that the harrow teeth 23 may be reinforced where the pressure will be the greatest against the ground.

The harrow teeth 23 are held in contact with the ground under normal conditions by means of a spring 25 which is hooked at an orifice 26 in the brace 20. To the other end of this spring 25 there is secured a bolt 25ª, this bolt 25ª being disposed in an orifice 27 in a depending arm 28 of a bracket 29 secured to the frame 7 by a bolt 30. A nut 31 meshes with the thread of the bolt 25ª and abuts against the depending arm 28 at the orifice 27, and it will be understood that the tension of the spring 25 may be adjusted by this means. Bolted to the horizontal beam 17 there is a forwardly extending arm 32 which is normally engaged by a screw 33, meshing in a threaded orifice in an arm 34 of the bracket 29, this screw 33 being held in adjusted position by a lock nut 35.

As an additional means to limit the downward movement of the rear ends 21 of the arms 19, a rod 36 is provided, the rear end of which is threaded and extends through an orifice 37 in the brace 20, nuts 38 meshing with the thread on the rear of the rod 36 at the front and rear of the brace. The forward end 36ª of the rod 36 is disposed in an orifice 39 in the depending arm 28, and a cotter pin 40 is disposed through an orifice in the rod to hold a washer 41 against the said arm 28.

It will be understood that the spring 25 will serve to hold the harrow teeth 23 yieldingly against the ground, and the pressure of these harrow teeth against the ground may be adjusted by means of the bolt 25ª and the nut 31. However, it will be understood that when the plowshares are raised from the ground, the frame 6 will also be raised, which will carry up the frame 7 of my attachment, and when this frame 7 is raised, the harrow teeth 23 will also be raised, inasmuch as they will be supported by means of the arms 19, the horizontal beam 17, the arm 32, and the bolt 33. But while this is so, the harrow teeth 23 will have any desired freedom of action, because of the spring 25 with the means for increasing the tension of the said spring.

The rod 36 will prevent the rear ends 21 of the arms 19 with the teeth 23 from slapping the ground unduly when the harrow attachment is in use.

It will be understood that the nut 31 may be removed from the bolt 25ª after which the harrow attachment may be swung forward and upwardly with the beam 17 as its axis, thereby removing the attachment from the ground when desired.

Having thus described my invention, what I claim as new and desire to secure by Letters Patent is:

1. In a harrow attachment for gang plows, a frame, a harrow member movably mounted on the frame, resilient means for moving the rear of the harrow member downwardly relatively to the frame, and means to limit the movement of the harrow member in the said direction.

2. In a harrow attachment for gang plows, a frame having two arms disposed at an angle to each other, an extension adjustable longitudinally of one arm, means to secure the extension in adjusted position to the said arm, the extension and the other arm being provided with bearings, a beam journaled in the bearings, and a harrow member extending from the beam.

3. In a harrow attachment for gang plows, a frame, a harrow member pivoted to the frame, resilient means for moving the rear of the harrow member downwardly, and means to limit the said downward movement of the harrow member.

4. In a harrow attachment for gang plows, a frame, a horizontal member pivoted to the frame, a harrow member secured to the horizontal member and extending therefrom in one direction, an arm on the horizontal member extending in the opposite direction, and adjustable means on the frame for engaging the arm to limit the movement of the harrow member.

5. In a harrow attachment for gang plows, a frame, a horizontal member pivoted to the frame, a harrow member secured to the horizontal member and extending therefrom in one direction, an arm on the horizontal member extending therefrom in the opposite direction, a bracket with a threaded orifice on the frame, and a screw meshing with the threaded orifice and engaging the arm for the purpose specified.

6. In a harrow attachment for gang plows, a frame, a horizontal member pivoted to the frame, a harrow member secured to the horizontal member and extending therefrom in one direction, an arm on the horizontal member extending in the opposite direction, resilient means for moving the harrow member in one direction, and adjustable means on the frame for engaging the arm to limit the movement of the harrow member in the said direction.

7. In a harrow attachment for gang plows, a frame, a horizontal member pivoted to the frame, a harrow member secured to the horizontal member and extending therefrom in one direction, an arm on the horizontal member extending therefrom in the opposite direction, a bracket with a threaded orifice on the frame, resilient means for moving the harrow member in one direction, and a screw meshing in the threaded orifice and normally engaging the arm to limit the movement of the harrow member in the said direction.

8. In a harrow attachment for gang plows, a frame having two arms disposed at an angle to each other, a bearing adjacent the outer end of one of the arms, an extension member, means for adjustably securing the extension member to the other of the arms, a bearing adjacent the outer end of the extension member, a beam journaled in the bearings, and a harrow member extending from the beam.

9. In a harrow attachment for gang plows, a frame having two arms disposed at an angle to each other, a bearing adjacent the outer end of one of the arms, an extension member, means for adjustably securing the extension member to the other of the arms, a bearing adjacent the outer end of the extension member, a beam journaled in the bearings, a harrow member extending from the beam, and resilient means for holding the harrow member downwardly.

10. In a harrow attachment for gang plows, a frame having two arms disposed at an angle to each other, a bearing adjacent the outer end of one of the arms, an extension member, means for adjustably securing the extension member to the other of the arms, a bearing adjacent the outer end of the extension member, a beam journaled in the bearing, a harrow member extending from the beam, resilient means for holding the harrow member downwardly, and means to limit the downward movement of the harrow member.

11. In a harrow attachment for gang plows, a frame having two arms disposed at an angle to each other, a bearing adjacent the outer end of one of the arms, an extension member, means for adjustably securing the extension member to the other of the arms, a bearing adjacent the outer end of the extension member, a beam journaled in the bearings, a harrow member extending from the beam, an arm on the horizontal member, a bracket on the frame provided with a threaded orifice, and a screw meshing in the threaded orifice and normally engaging the arm for the purpose specified.

12. In a harrow attachment for gang plows, a frame having two arms disposed at an angle to each other, bearings at the outer ends of the arms, a beam journaled in the bearings, and a harrow member extending from the beam.

13. In combination with an agricultural machine having a frame, a frame having two arms disposed at an angle to each other, clamps securing one of the arms of the frame to the frame of the agricultural machine, bearings at the outer ends of the arms, a beam journaled in the bearings, and a harrow member extending from the beam.

14. In a harrow attachment for gang plows, a frame having an orifice, a harrow member movably mounted on the frame, a rod secured to the harrow member and disposed in the orifice, and means on the rod for engaging the frame at the orifice to limit the movement of the rod in one direction.

JOHN SWAINSON.

Copies of this patent may be obtained for five cents each, by addressing the "Commissioner of Patents, Washington, D. C."